INVENTOR
C. W. HARRISON
BY Hugh S. Wertz
ATTORNEY.

Patented Nov. 24, 1953

2,660,625

UNITED STATES PATENT OFFICE 2,660,625

AUTOMATIC LEVEL CONTROL

Charles W. Harrison, Millington, N. J., assignor to Bell Telephone Laboratories, Incorporated, New York, N. Y., a corporation of New York Application November 25, 1950, Serial No. 197,608

10 Claims. (Cl. 179—171)

This invention relates to automatic volume or level control systems and, more specifically, to variable attenuators for use in such systems.

Automatic level control systems are known for regulating the output level of electronic amplifiers, whereby undesirably large variations thereof are inhibited. In one common type of automatic level control, there is incorporated in the input circuit of an amplifying stage a variable attenuation network. To achieve control, undesirable variations in the output are utilized to vary the attenuation of this network in a way to maintain a predetermined level. However, it has been characteristic of such networks that changes made to modify the attenuation thereof also effect changes in impedance characteristics. For some applications, it is desirable to utilize a variable attenuation network whose impedance characteristics are not appreciably disturbed by variations in the attenuation level of the network. For example, it may be important in an amplifier circuit to maintain accurate impedance matches in coupling to avoid reflections and other undesirable effects which result from mismatched coupling.

Accordingly, one object of this invention is to provide a variable attenuation network whose impedance characteristics remain constant despite variations in the attenuation level.

A related object is to avoid mismatches in the use of automatic level control systems.

Still another object is to provide an improved automatic level control system.

The variable attenuation network which is the principal feature of the present invention comprises a balanced bridged-T network having two fixed impedance series arms, a variable impedance bridging arm, and a variable impedance shunt arm. The attenuation level of the network is controlled by varying the impedance of the bridging arm. The input and output impedances characteristic of the network are maintained constant as the bridging arm impedance is changed by varying substantially simultaneously in a predetermined way the impedance of the shunt arm. For this purpose, there is utilized the fact that these input and output impedances remain constant so long as the network is kept balanced. An unbalance in this network is rebected by a voltage difference across one of the series arms which is normally balanced. Accordingly, in the present invention, any such voltage difference is utilized to vary the impedance of the shunt arm for restoring the balance. In a preferred species of such a network, thermistors serve as the variable impedance elements which make up the bridging and shunt arms.

In one aspect of the invention, such an attenuation network is utilized in the input stage of an amplifier whose output level is to be controlled. Variations from a predetermined output level are utilized to vary the heating current of the bridging arm thermistor in a direction to adjust the attenuation level of the network to a value which provides the desired output level. Moreover, by varying the resistance of the bridging arm thermistor, there is effected an unbalance in the balanced network which produces a voltage difference across one of the fixed impedance series arms. This unbalance is detected, amplified, and utilized to control the heating current flowing in the shunt arm thermistor in a manner to restore balance and thereby maintain substantially undisturbed the impedance characteristics of the network. In one embodiment, there is further provided a direct-current voltage source in the attenuation network to provide a direct current therein which facilitates detection and utilization of any series arm unbalance.

The invention will be better understood from the following more detailed description taken in connection with the accompanying drawing forming a part thereof, in which.

Figure 1A:
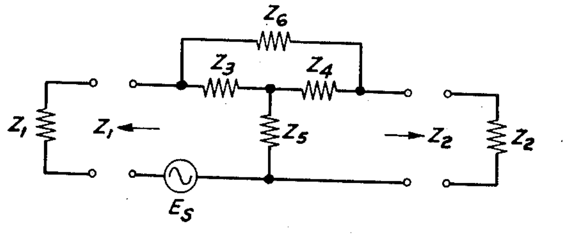
Figs. 1A and 1B are schematic circuits useful in describing the principles of the invention.
Figure 1B:
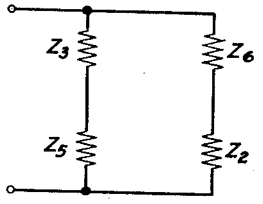

Referring more particularly to the drawing, Fig. 1A shows a bridged-T network in which the impedances $Z_3$ and $Z_4$ form the two series arms, the impedance $Z_6$, in shunt across the series arms, forms the bridging arm, and the impedance $Z_5$ the shunt arm. The effective input and output impedances are designated $Z_1$ and $Z_2$. For a perfect match, the terminals of the network should be terminated in their respective input and output impedances. If a voltage supply $E_s$ is inserted in the input of the network, the condition for balance is that there be no voltage developed across the series arm impedance $Z_4$. The bridged-T network, for this case, may be represented by the arrangement shown in Fig. 2 which comprises the series impedances $Z_3$ and $Z_5$ in parallel with the series impedances $Z_6$ and $Z_2$. It can then be shown that the condition for balance is:

$$Z_5=\frac{Z_2 Z_3}{Z_6} \quad (1)$$

It can be seen further that for a match at the input and output terminals, it is necessary that:

$$Z_1=\frac{(Z_3+Z_5)(Z_6+Z_2)}{Z_3+Z_5+Z_6+Z_2} \quad (2)$$

$$Z_2=Z_6+\frac{(Z_3+Z_5)Z_1}{Z_1+Z_3+Z_5} \quad (3)$$

By the use of Equation 1, Equations 2 and 3 can be rid of the term $Z_3$, and there are derived new expressions as follows:

$$Z_1=\frac{\left(\frac{Z_5 Z_6}{Z_2}+Z_5\right)(Z_6+Z_2)}{Z_5+Z_6+Z_2+\frac{Z_5 Z_6}{Z_2}} \quad (4)$$

$$Z_2=Z_6+\frac{\left(\frac{Z_5 Z_6}{Z_2}+Z_5\right)Z_1}{Z_1+Z_5+\frac{Z_5 Z_6}{Z_2}} \quad (5)$$

Now, using Equations 4 and 5, which must be met to satisfy the input and output terminal impedance-matching condition, there can be eliminated $Z_6$. There results then an expression which includes only $Z_1$, $Z_2$, and $Z_5$. Therefore, given a set of values for $Z_1$ and $Z_2$, the transmission attenuation and $Z_5$ are necessarily fixed. Hence, there is no combination of variables that will allow an impedance match at both input and output terminals for a given transmission attenuation. In practice, the transmission attenuation is to be varied and $Z_1$ and $Z_2$ fixed. Hence, in general, $Z_5$ cannot be made to satisfy the resultant expression. However, if it is required that $Z_1=Z_2=Z_3$, the resultant expression can be met, and there is also provided an additional degree of freedom necessary to permit impedance matches with variable attenuation.

Figure 2:
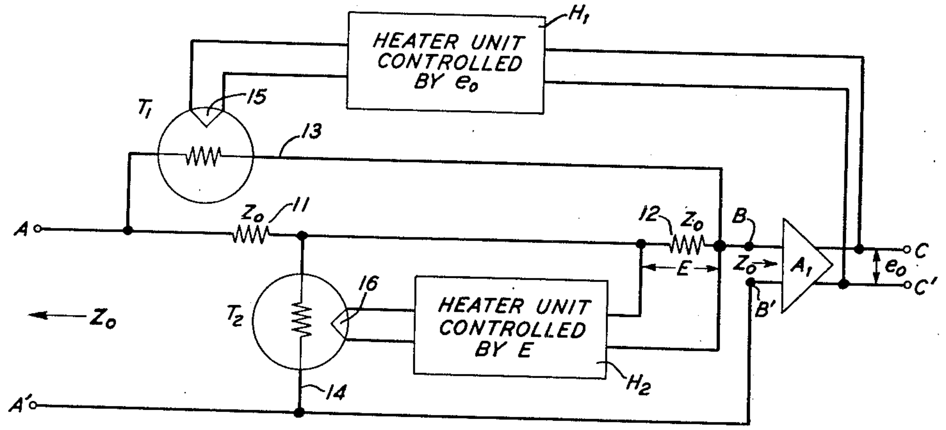
Fig. 2 shows, in schematic form, a bridged T thermistor type automatic level control circuit in accordance with the invention.

Fig. 2 shows schematically by way of example a thermistor type automatic level control circuit in accordance with one aspect of the invention. The attenuator element comprises the bridged-T network, having the two series arms 11 and 12, the bridging arm 13 in parallel across these series arms, and the shunt arm 14. In this exemplary embodiment, the two series arms have the fixed impedance value $Z_0$, the bridging arm includes a variable impedance made up of the indirectly heated thermistor $T_1$, and the shunt arm similarly includes a variable impedance consisting of the indirectly heated thermistor $T_2$. The input signals are supplied to the input terminals AA' of the T network, and the output therefrom is supplied by way of the output terminals BB' to the input of the amplifier $A_1$, across whose output terminals CC' is developed the voltage $e_0$. In accordance with the analysis set forth hereinabove for operation, the thermistors $T_1$ and $T_2$ are chosen so that both the input impedance seen at the terminals AA' and the output impedance seen at the terminals BB' are equal to $Z_0$, the impedance of each of the series arms 11 and 12. To derive the advantages of the invention, it is desired to vary the attenuation of the bridged-T network in order to keep the voltage $e_0$ substantially at a predetermined level without affecting the impedance $Z_0$ seen at the terminals AA' and BB'.

As the voltage $e_0$ varies outside its predetermined limits, this variation is communicated to the heater unit $H_1$, which is connected across the output terminals CC' and which controls the current supplied to the heating element 15 of the thermistor $T_1$. This unit can be any arrangement which will respond to control voltages to provide heating currents. The characteristics of the heater unit $H_1$ and the thermistor $T_1$ are chosen so that the resistance of the thermistor $T_1$ is varied sufficiently to modify the attenuation of the bridged-T network in a way to restore the output voltage $e_0$ to within its predetermined limits. In this way, automatic level control is achieved.

Additionally, in order to realize the advantages of this invention, measures must be taken to maintain substantially undisturbed the input and output impedances of the bridged-T network during changes in the resistance of the thermistor $T_1$. It can be seen from the analysis set forth hereinabove that changes in the resistance of the thermistor $T_1$ act to unbalance the bridged-T network and set up a voltage E in the series arm 12. To utilize this unbalance, there is connected across this series arm 12 the heater unit $H_2$ which controls the current flowing in the heating element 16 of the thermistor $T_2$. By this arrangement, the unbalance voltage E is used to vary the resistance of the thermistor $T_2$. The characteristics of the heater unit $H_1$ and the thermistor $T_2$ are chosen so that the thermistor $T_2$ is maintained at a resistance $$R_{T_2}=\frac{Z_0^2}{R_{T_1}}$$

where $R_{T_1}$ is the resistance of the thermistor $T_1$. As long as this relationship is met, the bridged-T network is balanced, and the input and output impedances are maintained at the value $Z_0$. In this way, a constant impedance match is maintained despite the changing attenuation of the network.

Figures 3, 4:
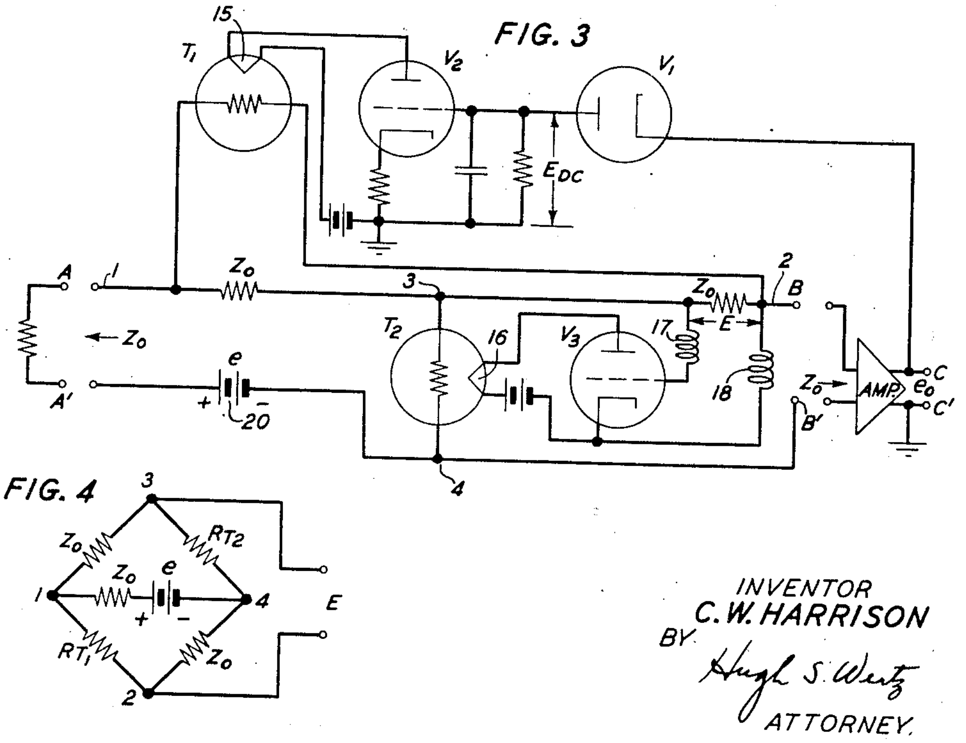
Fig. 3 shows diagrammatically an exemplary embodiment of the invention adapted for radio frequency signals.
Fig. 4 shows the equivalent bridge circuit of the impedance balancing arrangement of Fig. 3.

Fig. 3 illustrates a circuit arrangement for automatic level control which has been designed particularly for application at radio frequencies. As before, the bridged-T network comprises two fixed impedance series arms 11 and 12, the variable impedance bridging arm 13 made up of the indirectly heated thermistor $T_1$, and the variable impedance shunt arm 14 made up of the indirectly heated thermistor $T_2$. The input signals are supplied to the input terminals AA' of the network. The output terminals BB' of the network supply the amplifier $A_1$ which develops across its output terminals CC' the voltage $e_0$ whose peak-to-peak magnitude is to be controlled within predetermined limits. Variations from these limits are supplied by way of the diode $V_1$ to the grid of the tube $V_2$ whose plate current supplies the heating element 15 of the thermistor $T_1$. For example, suppose that the output voltage $e_0$ starts to increase. The diode output $E_{dc}$ will increase, increasing the bias of the tube $V_2$ and decreasing the plate current flow in the heating element 15. This decrease in current causes an increase in the resistance of the thermistor $T_1$, thus attenuating the transmission through the bridged-T network and thereby decreasing the output voltage $e_0$ until it is restored within the predetermined limits. Again, the change in value of the resistance $R_{T_1}$ of the bridging arm thermistor $T_1$ will result in a mismatch unless the value of the resistance $R_{T_2}$ of the shunt arm thermistor $T_2$ is made to adjust itself to the new value of $$\frac{Z_0^2}{R_{T_1}}$$

Although the unbalance of signal frequency developed across the series arm 12 can be used to control the thermistor $T_2$ at high frequencies, it may be advantageous to utilize separate means to determine the degree of unbalance of mismatch. By introducing in the attenuator network a second voltage $e$, at a frequency appreciably lower than that of the signal frequency to be transmitted through the attenuator, the unbalance voltage E can be sampled with greater ease and without detrimental effects to the transmitted signal. The arrangement in Fig. 3 includes a direct-current source 20 having effectively an internal impedance $Z_0$ for providing a second voltage $e$ which will produce a direct-current unbalance voltage E. This unbalance voltage is applied between the cathode and control grid of the tube $V_3$ whose plate current supplies the heating element of the thermistor $T_2$. The inductances 17 and 18 are used to isolate the tube $V_3$ from the radio frequency unbalance that can exist simultaneously across the series arm 12. As a matter of fact, if the control currents also are fed through choke coils, it would be possible to utilize direct heating type thermistors. In Fig. 4, there is illustrated the equivalent bridge balancing circuit which results from the arrangement of Fig. 3. For the case in which the resistance $R_{T_1}$ increases, the voltage E is positive and increases the plate current of tube $V_3$. This results in a reduction of resistance $R_{T_2}$, which in turn will reestablish the balance of the bridge. In this way, automatic level control can be realized without disturbing the impedance match.

It is to be understood that the above-described arrangements are merely illustrative of the principles of the invention. Other arrangements and other applications of such a variable attenuator can be devised by one skilled in the art without departing from the spirit and scope of the invention. In addition, it can be appreciated that a number of such attenuator elements can be used in tandem to increase the range of attenuation.

What is claimed is:

1. An arrangement for attenuation control comprising a balanced bridged-T network having two impedance series arms, a variable impedance bridging arm, and a variable impedance shunt arm, means for varying the impedance of the bridging arm for changing the attenuation of the network and for producing a voltage unbalance across the normally balanced series arm, and means for utilizing said voltage unbalance for varying the impedance of the shunt arm and readjusting the network to balance.

2. An arrangement for attenuation control comprising a balanced bridged-T network having two fixed impedance series arms, a variable impedance bridging arm, and a variable impedance shunt arm, means for applying a voltage across the input of said network, means for varying the impedance of the bridging arm for changing the attenuation of the network and for producing an unbalance across the normally balanced series arm, and means for utilizing said unbalance for varying the impedance of the shunt arm and readjusting the network to balance.

3. A variable attenuator comprising a balanced bridged-T network having two fixed impedance series arms, a variable impedance bridging arm, a variable impedance shunt arm, means for varying the impedance of the bridging arm for changing the attenuation of the network and producing a voltage unbalance across the normally balanced series arm, and means utilizing said unbalance for varying the impedance of the shunt arm and readjusting the balance for restoring the impedance characteristics of the network.

4. A variable attenuator comprising a balanced bridged-T network having two fixed impedance series arms, a variable impedance thermistor in the bridging arm, and a variable impedance thermistor in the shunt arm, means for applying a voltage to the input of said network, means for varying the impedance of the thermistor bridging arm for changing the attenuation of the network, means for utilizing the unbalance voltage developed across the normally balanced series arm as a result of varying the impedance of the thermistor bridging arm for varying the impedance of the thermistor shunt arm and readjusting the balance of the network.

5. A level control system comprising an amplifier whose output level is to be controlled, a balanced bridged-T network connected in the input circuit of said amplifier and having two fixed impedance series arms, a variable impedance bridging arm, and a variable impedance shunt arm, means for applying voltages to the input of the network for producing output voltages from said amplifier, means for varying the output voltage of said amplifier by varying the impedance of the bridging arm, and means utilizing the unbalance voltage developed across the normally balanced series arm resulting from varying the impedance of the bridging arm for varying the impedance of the shunt arm to readjust the balance of the network.

6. A level control system according to claim 5 in which the variable impedance bridging arm and the variable impedance shunt arm include a thermistor.

7. An automatic level control system comprising an amplifier whose output level is to be controlled, a balanced bridged-T network connected in the input circuit of said amplifier and having two fixed impedance series arms, a variable impedance bridging arm, and a variable impedance shunt arm, means for applying input voltages to the input terminals of said network for producing output voltages from said amplifier, means for varying the impedance of the bridging arm in accordance with variations in the output level of said amplifier, and means utilizing the unbalance across the normally balanced series arm, resulting from varying the bridging arm, for varying the impedance of the shunt arm and readjusting the network to balance.

8. An automatic level control system according to claim 7 in which the variable impedance bridging arm and the variable impedance shunt arm include a thermistor.

9. An automatic level control system comprising an amplifier whose output level is to be controlled, a balanced bridged-T network connected to the input circuit of said amplifier, and having input and output fixed impedance series arms, a variable impedance bridging arm, and a variable impedance shunt arm, means for applying signal voltages to the input terminals of said network for producing output voltages from said amplifier, means for inserting a control D.-C. voltage in the input of said network, means controlled by the output level of the amplifier for varying the impedance of the bridging arm for maintaining said output level within predetermined levels, means controlled by the D.-C. unbalance voltage across the normally balanced series arm for varying the impedance of the shunt arm and readjusting the balance of the network.

10. An automatic level control according to claim 9 in which the variable impedance bridging arm and the variable impedance shunt arm each include a thermistor.

CHARLES W. HARRISON.

References Cited in the file of this patent

UNITED STATES PATENTS

| Number | Name | Date |
|---|---|---|
| 2,246,307 | Krist | June 17, 1941 |
| 2,345,066 | Nylund | Mar. 28, 1944 |
| 2,503,046 | Hills | Apr. 4, 1950 |
| 2,523,791 | Vahle et al. | Sept. 26, 1950 |